A. O. M. LÖFGREN.
PORTABLE SAWING MECHANISM.
APPLICATION FILED DEC. 5, 1918.
1,303,809.
Patented May 13, 1919.
2 SHEETS—SHEET 1.
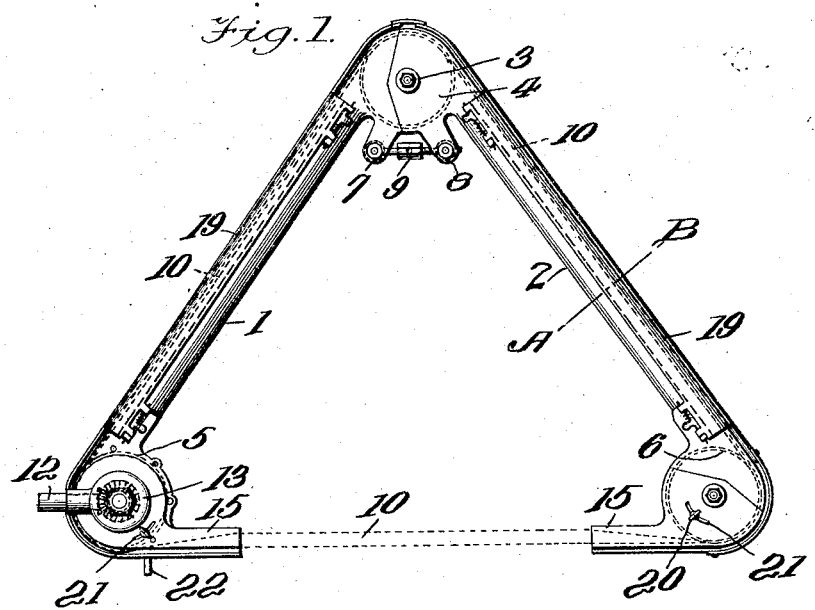
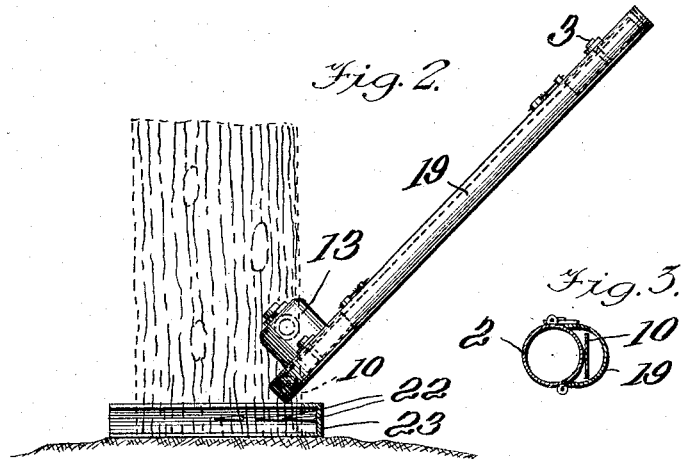
INVENTOR
A.O.M. Löfgren
BY H.R. Kerslake
ATTORNEY

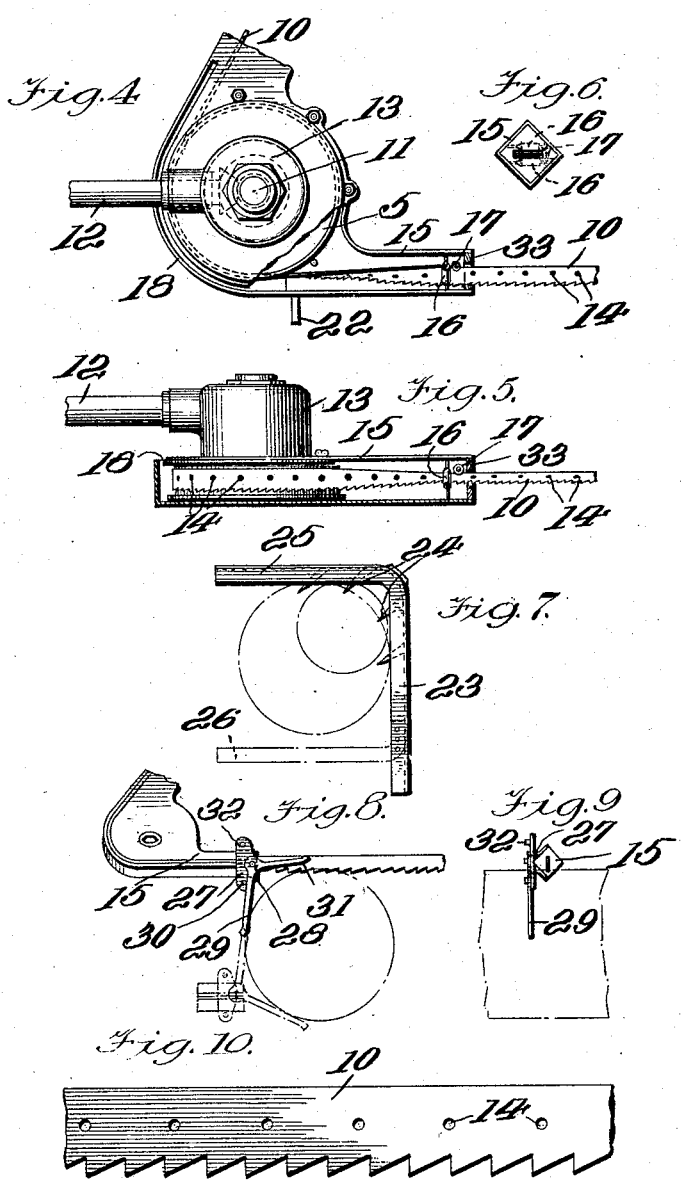

UNITED STATES PATENT OFFICE.

ALBERT OLOF MELCHER LÖFGREN, OF STOCKHOLM, SWEDEN.

PORTABLE SAWING MECHANISM.

1,303,809. Specification of Letters Patent. Patented May 13, 1919.

Application filed December 5, 1918. Serial No. 265,464.

*To all whom it may concern:*

Be it known that I, ALBERT OLOF MELCHER LÖFGREN, mechanic, a subject of the King of Sweden, and resident of Sturegatan 11, Stockholm, Sweden, have invented certain new and useful Improvements in Portable Sawing Mechanisms, of which the following is a specification, reference being made to the accompanying drawings.

The present invention relates to a tree felling apparatus whereof several different constructions already exist but of these there is none, however, that has hitherto been applied in practice in any wider degree, which mostly depends thereupon that in the same is used a saw in the form of a chain, which, as is easily understood, is rather weak and besides very expensive. In consequence of the lack of durability, great loss of time is frequently caused if necessary repairs are to be made or a new chain is to be inserted at the place where the work is carried on. In any case, a chain, in consequence of the great strain on the many weak links, is rather soon worn out, and then a new chain must be inserted.

The present invention has for its object to remedy the said disadvantages. This object has been attained thereby that the saw-chain has been substituted by a band-saw, arranged in a frame which, as in some other constructions, might be made to stretch the band-saw and which is provided with deviating rollers, over which the band-saw is running. In order, however, that a frame provided with a band-saw may be advantageous in using, it has been necessary to arrange the band-saw blade in another way than that in which the saw chains have been arranged as will be further described below.

A tree felling apparatus constructed in accordance with the present invention is shown in the accompanying drawings in which Figure 1 is a plan and Fig. 2 a side view of the same in the position which it assumes in felling a tree. Fig. 3 is a section on the line A—B in Fig. 1. Figs. 4 and 5 show the driving device for the saw, seen in plan and from the side. Fig. 6 shows a detail. Fig. 7 shows a frame adapted to support the apparatus in sawing through the trunk of a standing tree. Figs. 8 and 9 show a device in the apparatus, viewed from two different sides, and intended to be used in cutting the trunk of a tree after it has been felled. Fig. 10 shows a part of the saw-blade.

In the form of apparatus shown in the drawings, the saw frame is triangular and formed of two rods 1 and 2, which preferably consist of light steel tubes, and each of which at either end is provided with an extension constructed of plates, as a casing or cover for a disk, serving as a deviating roller, over which the band-saw blade runs, and the shaft of which is carried by the said plates. The shaft 3 of the roller 4, which is at the point of junction between the extensions of the rods 1 and 2, also serves as the axle about which these rods may turn, so that their other ends, with the rollers 5 and 6, can be approached to and drawn apart from one another. In order to adjust and keep the last-named rollers at the required distance from one another, there are on the plates for the roller 4 projecting ears 7 and 8, of which the ears 7, which project from the plates to the rod 1, serve as supports for one end of a bolt 9, the other threaded end of which enters into a nut arranged between the ears 8 which project from the plates to the rod 2. By screwing the bolt 9 in one direction or the other, the distance between the rollers 5 and 6 is increased or diminished. Over the rollers 4, 5 and 6 is laid an endless band-saw blade 10, the length of which is adjusted to the length of the rods 1 and 2, and to the desired distance between the rollers 5 and 6. The saw-blade is set in motion by one of the rollers (in the drawing the roller 5), which is arranged as a driving roller, and the shaft 11 of this roller, Figs. 1, 4 and 5, is for that purpose acted upon by, for instance, a driving shaft 12 with the aid of a bevel gear inclosed in the cover or casing 13, which is mounted on the casing of the roller. In order to insure that the roller really may drive the blade without this latter being tightly stretched, the roller is on its circumference provided with a number of pins or the like, which enter into corresponding apertures 14 arranged in the blade or in recesses made in one or both edges of the same.

In order to set that part of the saw-blade, which is between the rollers 5 and 6 and which is intended to carry out the sawing, in a suitable position in relation to the saw frame, so that the sawing can be conveniently executed, there extends from the casing for each of the rollers 5, 6 a guide-arm 15, at the ends of which are arranged two guide-rollers 16, (Fig. 6) between which the saw-blade runs, and also a supporting roller 17 at the back of the saw-blade. The guide rollers 16 are so placed that the blade between them and the place of contact of the blade with the adjacent roller 5 and 6 respectively is twisted about ⅛ of a turn, so that the saw frame, when the side surfaces of the blade in the opening between the rollers 5 and 6 is in a horizontal plane, assumes approximately the position indicated in Fig. 2. For it is evident that, if there should be no device for the twisting of the saw blade, the saw frame would have to be set vertically, i. e. parallel to the tree trunk to be cut, in order that a horizontal cut through the tree might be obtained, which, however, would be impossible, as the trunk would prevent the saw frame being fed forward.

In place of the rollers 16, 17, there may be placed, if so desired, at the outer end of each of the two arms 15, a disk 33, Figs. 4 and 5, which, for example, may be of so-called "fiber," and which is simply provided with a slit suited to the saw blade and in such a position that the blade is turned by the slit in the same position as by the rollers 16.

In order that a saw-blade may be easily inserted in, and removed from the frame, the rods 1 and 2 are so placed in relation to the rollers 4, 5 and 6, that the blade runs freely at the side of each of the two rods (see Fig. 3), while at that part of the circumference of the rollers 4, 5 and 6, where the saw-blade is in contact with the same, there is in the casing for each of the rollers an opening 18 (see Figs. 4 and 5) through which the blade can, on edge, be inserted or taken out from its place. In the guide arms 15 there are also corresponding openings or slits for the insertion and removal of the blade. As a protection for the blade 10 running along the rods 1 and 2, as well as for the hands, when in sawing, or otherwise, the rods are held with the latter, there is provided a channel 19, Figs. 1, 2 and 3, placed along each of the rods. This channel 19 may be at one of its edges hinged to the rod, and at its other edge provided with some fastening device (a sliding bolt or the like), so that the space formed between the channel and the rod can be opened and closed for the insertion and removal of saw-blades.

In exchanging saw-blades it frequently occurs that the blade which is inserted in place of the previous blade is of another length than the old one, in which case the distance between the rollers 5 and 6 requires to be adjusted, which is effected with the aid of the bolt 9, but when altering that distance the direction of the guide arms 15 obviously also requires to be adjusted. This is effected by the arrangement that each of the two guide arms at the end adjacent to the roller forms part of the casing which surrounds the roller, and that this part, together with the arm, is rotatable around the shaft of the roller. In order that each of the two arms 15, after it has been adjusted in the required direction, may be retained in that position, there is a locking device, which may consist of, for instance, a screw 20, the nut of which is mounted in one part of the casing and for which there is a circular slit 21 in the other part of the casing.

In felling a tree it is necessary to keep the ends of the guide arms 15, opposing one another, at a distance from the tree, so that when the saw passes through the latter, these arms do not come into contact with the tree. For attaining this purpose, that arm, which the saw, in sawing, strives to draw toward the tree, is provided with a pin 22, for which there is a guide, consisting of a frame 23 (Figs. 2 and 7) placed on the ground close to the tree, which may suitably consist of a bent U-iron, or angle iron, or the like, and which may be furnished with spikes 24 to be driven into the trunk, so that the frame lies steady. The frame is preferably provided with two arms 25, 26, so that a support is obtained for each of the guide arms 15, and one of which arms 26, if so desired, can be made adjustable to suit different distances between the rollers 5 and 6. One of the outer sides of the frame, preferably that on the arm 25, forms in the sawing, the guide along which the pin 22 runs and which thereby prevent the arm 15 from being drawn toward the tree.

In order to enable the apparatus to be used also for the cutting of felled trunks, there is a device, consisting of a holder 27, adapted to be placed on that arm 15, which is provided with the pin 22 and this holder carries an angle (Figs. 8 and 9) which is rotatable on a pivot 28 projecting from the holder. At the beginning of the sawing, the angle assumes the position indicated in Fig. 8 by full lines, the arm 29 of the angle then resting against the side of the trunk, receives support against a pin 30 mounted on the holder, so that the guide arm 15 cannot be drawn toward the trunk. As the saw penetrates into the trunk, the other arm 31 of the angle approaches the same, whereupon the angle, as the saw penetrates deeper into the trunk, begins to rotate around the pivot 28, and continues doing so until the other arm 31 of the angle comes in contact with the pin 32 intended for the latter and mounted on the holder, when further turning of the angle is hereby rendered impossible, and if the trunk has not yet been sawed through, the arm 29 gets out of contact with the trunk and only the arm 31 rests against it.

Having now described my invention, what I claim as new and desire to secure by Letters Patent is:

1. A portable sawing mechanism comprising a pair of rods, cheek extensions on said rods, a pivot connecting the cheeks of one rod to those of the other, rollers carried by each end of said rods and mounted on said pivot, said cheek extensions forming housings for said rollers, a flexible saw running over said rollers, and longitudinal housings pivoted on said rods, the saw running between said rods and said housings.

2. A portable sawing mechanism comprising a pair of rods, cheek extensions on said rods, a pivot connecting the cheeks of one rod to those of the other, rollers carried by each end of said rods and mounted on said pivot, said cheek extensions forming housings for said rollers, a flexible saw running over said rollers, and tubular extensions pivotally connected to the other cheek extensions for inclosing the ends of the run of the saw otherwise exposed.

3. A portable sawing mechanism comprising a pair of rods, cheek extensions on said rods, a pivot connecting the cheeks of one rod to those of the other, rollers carried by each end of said rods and mounted on said pivot, said cheek extensions forming housings for said rollers, a flexible saw running over said rollers, and tubular extensions pivotally connected to the other cheek extensions for inclosing the ends of the run of the saw otherwise exposed, and means for locking said tubular extensions in a determined position.

4. A portable sawing mechanism comprising a pair of rods, cheek extensions on said rods, a pivot connecting the cheeks of one rod to those of the other, rollers carried by each end of said rods and mounted on said pivot, said cheek extensions forming housings for said rollers, a flexible saw running over said rollers, and tubular extensions pivotally connected to the other cheek extensions for inclosing the ends of the run of the saw otherwise exposed, and means located in the tubular extensions for changing the plane of the run of the saw.

5. A portable sawing device comprising a frame and a saw traveling on said frame, means carried on said frame to engage the work and resist the tendency of the saw travel to move the frame bodily, said means comprising an angle bar pivoted to the frame, so arranged that one arm engages the work and as the saw enters the work the bar may oscillate on its pivot to engage the other arm thereof.

In witness whereof I have hereunto set my hand in presence of two witnesses.

ALBERT OLOF MELCHER LÖFGREN.

Witnesses:
CARL TH. SUNDHOLM,
R. TÔTTERMAN.